United States Patent
Choi et al.

(10) Patent No.: US 10,974,576 B2
(45) Date of Patent: Apr. 13, 2021

(54) ADJUSTABLE DOOR GLASS ASSEMBLY

(71) Applicants: Hyundai Motor Company, Seoul (KR); Kia Motors Corporation, Seoul (KR)

(72) Inventors: Hyung-Sik Choi, Seoul (KR); Gyung-Jae Heo, Gyeonggi-do (KR); Eui-Chan Cho, Gyeonggi-do (KR); Jea-Hong Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 48 days.

(21) Appl. No.: 16/218,820

(22) Filed: Dec. 13, 2018

(65) Prior Publication Data

US 2020/0114737 A1 Apr. 16, 2020

(30) Foreign Application Priority Data

Oct. 15, 2018 (KR) .................. 10-2018-0122499

(51) Int. Cl.
  *B60J 5/04* (2006.01)
  *B60J 1/17* (2006.01)
  *B60J 10/76* (2016.01)

(52) U.S. Cl.
  CPC .............. *B60J 5/0402* (2013.01); *B60J 1/17* (2013.01); *B60J 10/76* (2016.02)

(58) Field of Classification Search
  CPC ..... B60J 5/0402; B60J 5/76; B60J 5/79; B60J 5/77
  See application file for complete search history.

(56) References Cited

U.S. PATENT DOCUMENTS

| | | | | |
|---|---|---|---|---|
| 2,449,210 A | * | 9/1948 | Faust | B60J 5/0402 49/452 |
| 4,761,915 A | * | 8/1988 | Marz | B60J 1/17 49/374 |
| 5,855,095 A | * | 1/1999 | Dedrich | B60J 1/17 403/389 |
| 8,127,493 B2 | * | 3/2012 | Cappelli | E05F 11/382 49/212 |
| 2007/0214726 A1 | * | 9/2007 | Graf | E05F 11/382 49/352 |
| 2009/0211159 A1 | * | 8/2009 | Iennarella | E05F 11/382 49/358 |

(Continued)

FOREIGN PATENT DOCUMENTS

KR  2009 0117252 A  11/2009

*Primary Examiner* — Gregory J Strimbu
(74) *Attorney, Agent, or Firm* — Mintz Levin Cohn Ferris Glovsky and Popeo, P.C.; Peter F. Corless (57) ABSTRACT

A door glass assembly includes a door frame configured to form a door of a vehicle, a door glass configured to be installed in the door frame to be ascended and descended relative to the door frame, a garnish configured to be engaged with an outer surface of the door frame so that the outer surface of the door frame is finished with the garnish, a slider installed on the door glass and having a front end received in the door frame to guide the door glass, and a position adjusting part provided on an inner surface of the door glass and configured to adjust a gap between an end portion of the door glass and the garnish.

9 Claims, 8 Drawing Sheets

(56) References Cited

U.S. PATENT DOCUMENTS

| | | | |
|---|---|---|---|
| 2016/0121701 A1* | 5/2016 | Yoshida | B60J 1/17 49/372 |
| 2016/0176269 A1* | 6/2016 | Alhof | B60J 5/0408 49/502 |
| 2017/0129318 A1* | 5/2017 | Uemura | B60J 5/0402 |
| 2018/0257461 A1* | 9/2018 | Horneck | B60J 10/79 |
| 2019/0078366 A1* | 3/2019 | Lu | E05F 11/385 |
| 2020/0123832 A1* | 4/2020 | Bose | B60J 5/0416 |

* cited by examiner

ADJUSTABLE DOOR GLASS ASSEMBLY

CROSS-REFERENCE TO RELATED APPLICATION

This application claims under 35 U.S.C. § 119(a) the benefit of Korean Patent Application No. 10-2018-0122499, filed on Oct. 15, 2018, the entire contents of which are incorporated herein by reference.

BACKGROUND

(a) Technical Field

The present disclosure relates to a door glass mounted on a door of a vehicle, more particularly, to a door glass assembly capable of adjusting a gap between a circumference of the door glass and a door structure.

(b) Description of Related Art

A glass for allowing daylight to pass therethrough and enabling ventilation of a vehicle is installed at a door 110 of the vehicle.

Figure 1:
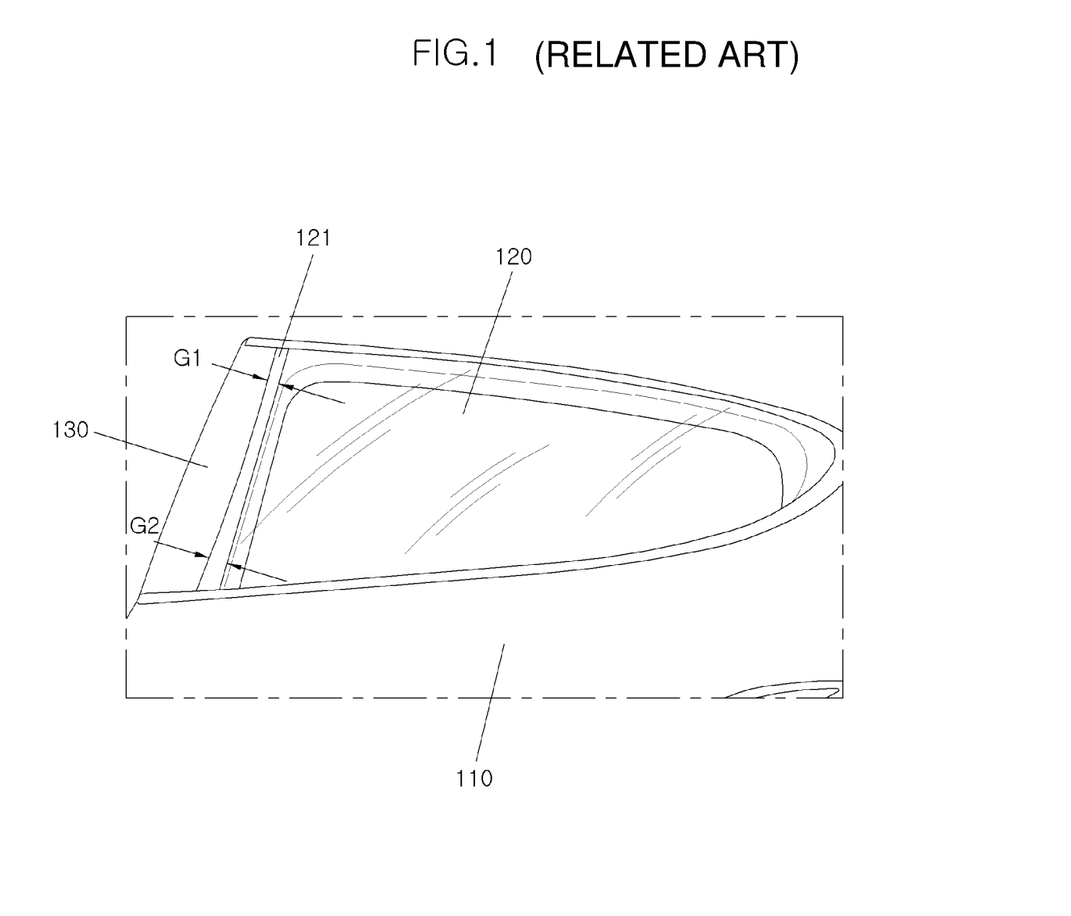
FIG. 1 (RELATED ART) is a side view illustrating a gap between a door glass and a garnish according to a related art.
Figure 2:
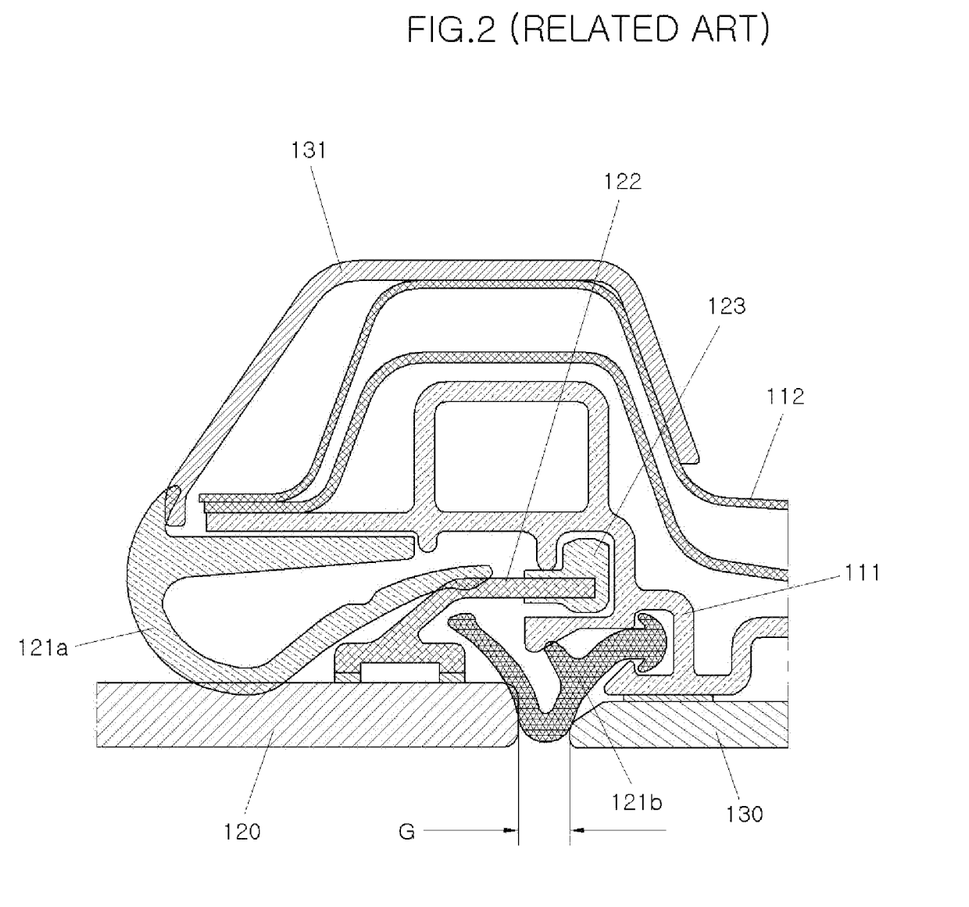
FIG. 2 (RELATED ART) is a cross-sectional view illustrating a portion at which the door glass is fixed according to the related art.

As shown in FIG. 1 (RELATED ART), in the vehicle, there is an example in which a door glass 120 is installed without a stepped level between the door glass 120 and a garnish 130. The door glass 120 may have a structure as shown in FIG. 2 (RELATED ART). A space in which glass runs 121a and 121b are installed is formed inside a door frame 111. The glass runs 121a and 121b are engaged in a space formed inside the door frame 111. A door slider 122 is attached to an end portion of the door glass 120 to be fixed to an inner side of the door glass 120 and ascend or descend inside the glass runs 121a and 121b and the door frame 111. The glass runs 121a and 121b are supported by being brought into close contact with the door glass 120 and the slider 122, and a contactor 123 is brought into contact with one side of the door frame 111 at an end portion of the slider 122 to reduce friction when the slider 122 ascends or descends. The garnish 130 is engaged with the outside of the door frame 111 to finish an outer surface of the door frame 111. An interior side of the door frame 111 is finished with a door trim 131. In an interior of a vehicle, the glass run 121a, a door inner plate 112, and the like is finished with the door trim 131.

When the door glass 120 is installed at the door frame 111, the slider 122 is attached to an inner surface of the door glass 120 and an end portion of the slider 122 slides on the door frame 111 such that the door glass 120 and the garnish 130 are located at the same height, i.e., on the same plane, without a stepped level.

Since the stepped level is not present between the door glass 120 and the garnish 130, there are advantages in which an appearance of the vehicle is improved and noise due to the stepped level is not generated when the vehicle is driving.

However, in such a door 110, when the door glass 120 is assembled, there is a problem in that it is difficult to keep a gap between the door glass 120 and the garnish 130 constant.

When the gap between the door glass 120 and the garnish 130 is not kept constant, as shown in FIG. 1, the door glass 120 and the garnish 130 may be assembled to cause different gaps at upper and lower portions of the door glass 120. That is, as shown in FIG. 1, when an upper gap G1 and a lower gap G2 are different from each other, an appearance of the vehicle is inevitably degraded. In order to correct the above-described problem, there is an inconvenience in that an assembly operation should be performed again or a position of the door glass 120 should be adjusted at each of portions of the door glass 120 in a state of being assembled.

SUMMARY

An embodiment of the present disclosure is directed to a door glass assembly capable of adjusting position, which is capable of adjusting a gap between a door glass and a garnish by easily pushing or pulling an end portion of the door glass inside a vehicle.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a door glass assembly capable of adjusting position, which includes a door frame configured to form a door of a vehicle, a door glass configured to be installed at the door frame to be ascended and descended, a garnish configured to be engaged with an outer surface of the door frame so that an outer surface of the door frame is finished with the garnish, a slider installed on at an inner circumference of the door glass and having a front end received in the door frame to guide the door glass to be ascended and descended, and a position adjusting part provided at an inner surface of the door glass and configured to adjust a gap between an end portion of the door glass and the garnish by varying a position of the slider.

The position adjusting part may include a holder installed at the inner surface of the door glass and configured to accommodate the slider in a fixed state and be brought into contact with an outer surface of the slider, and an adjusting bolt configured to be rotatably installed at the holder and be screw-coupled to a rear end of the slider.

The holder and the slider may be engaged with each other to be fixed and positions thereof are fixed, and a gap between the end portion of the door glass and the garnish is adjusted by rotating the adjusting bolt and adjusting a relative distance between the holder and the slider.

One side surface of the slider may be supported on the holder, and teeth are formed at one side surface of the holder and the one side surface of the slider, wherein the teeth are engaged with each other.

The holder may be attached to an inner surface of the door glass with an adhesive.

The slider may be installed in a direction perpendicular to a direction in which the door glass is ascended and descended.

A guide recess may be formed at the door frame and configured to guide ascending and descending of the slider, and a contactor may be provided at a front end of the slider and accommodated in the guide recess.

The position adjusting part may be installed at a circumference of the door glass at a regular interval.

The position adjusting part may be installed in a vertical direction of the door glass at regular interval.

The position adjusting part may be provided at each of positions adjacent to an upper end and a lower end of the door glass.

A glass run made of synthetic rubber may be installed between the door frame and the door glass to tightly seal between an inner surface of the door frame and the door glass.

The door glass and the garnish may be assembled without a stepped level.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a door glass assembly capable of adjusting position according to the present disclosure will be described in detail with reference to the accompanying drawings.

Figure 3:
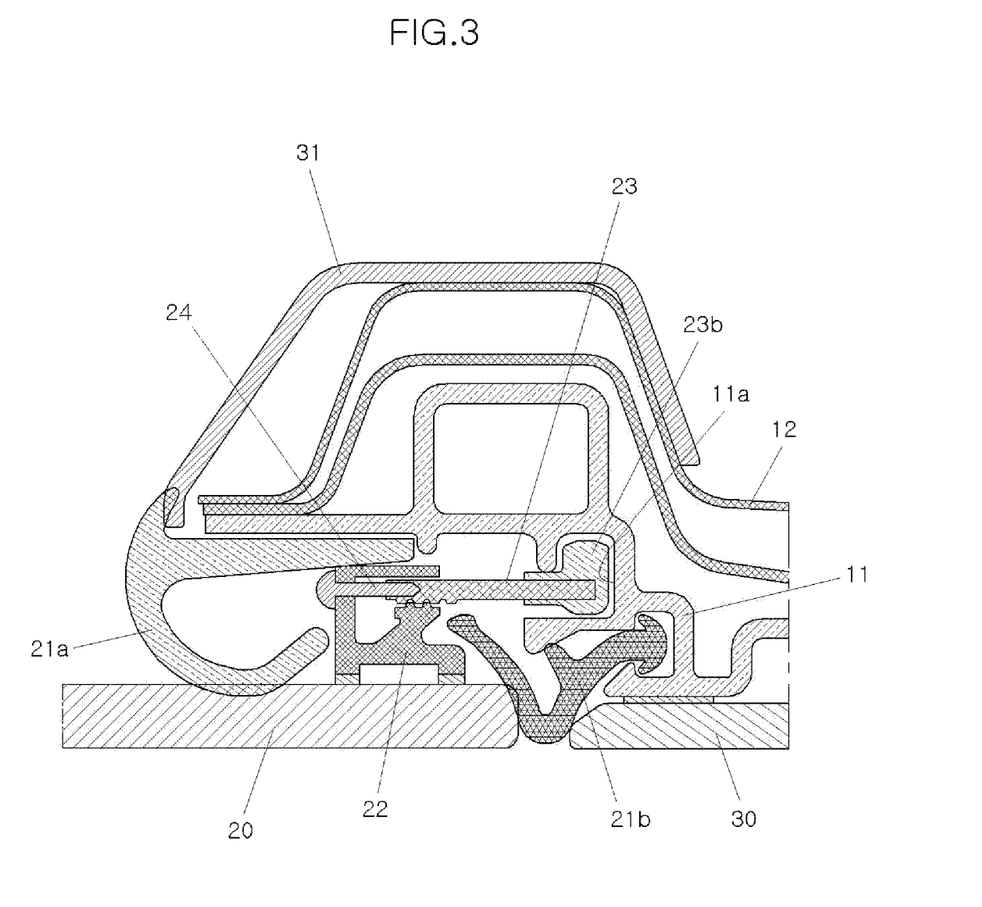
FIG. 3 is a cross-sectional view illustrating a portion at which a door glass assembly capable of adjusting position according to the present disclosure is fixed to a door frame.
Figure 4:
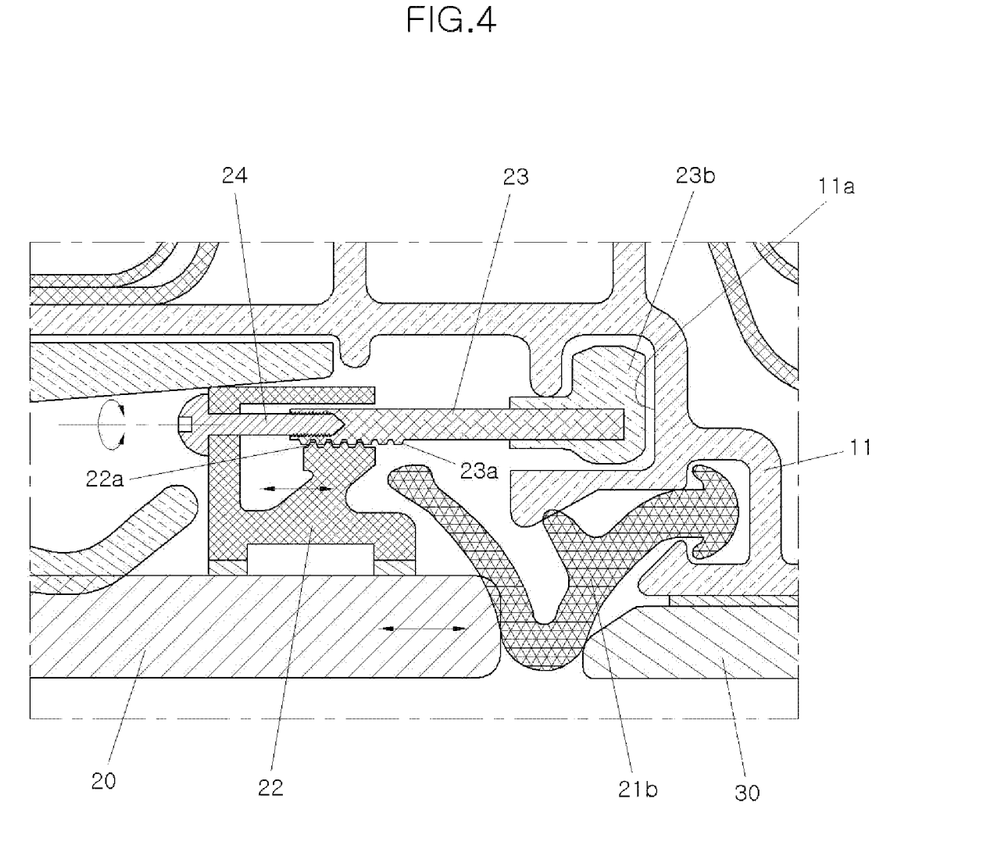
FIG. 4 is an enlarged view of a main part of FIG. 3.

As shown in FIGS. 3 and 4, a door glass assembly capable of adjusting position according to the present disclosure includes a door frame 11 for forming an appearance at a door of a vehicle, a door glass 20 installed at the door frame 11 to be ascendable and descendable, a garnish 30 engaged with an outer surface of the door frame 11 so that the outer surface thereof is finished with the garnish 30, a slider 23 installed at an inner circumference of the door glass 20 and having a front end accommodated inside the door frame 11 to guide ascending and descending of the door glass 20, and a position adjusting part for varying a position of the slider 23 to adjust a gap between an end portion of the door glass 20 and the garnish 30 at an inner surface of the door glass 20.

The door frame 11 serves to maintain strength of the door of the vehicle. The door glass 20 is installed at an upper portion of the door and is opened or closed when the door is ascended or descended.

The garnish 30 is engaged with the outer surface of the door frame 11 so that the outer surface thereof is finished with the garnish 30. Since the garnish 30 is assembled with the door glass 20 without a stepped level, the door glass 20 and the garnish 30 are located at the same plane at least a portion where the door glass 20 and the garnish 30 are adjacent to each other and, in a cross-sectional view, the door glass 20 and the garnish 30 are located on the same straight line.

In the present disclosure, in order to assemble the door glass 20 and the garnish 30 to each other without a stepped level, the slider 23 is provided at a rear surface of the door glass 20 to guide ascending and descending the door glass 20, and the position adjusting part is provided at the inner surface of the door glass 20 to vary a position of the slider 23 and adjust a gap between a circumference of the door glass 20 and the garnish 30.

Glass runs 21a and 21b made of synthetic rubber are installed between the door frame 11 and the door glass 20 to tightly seal between an inner surface of the door frame 11 and the door glass 20.

Further, an interior side of the door frame 11 is finished with a door trim 31. In an interior of a vehicle, the glass run 21a, a door inner plate 12, and the like is finished with the door trim 31.

The position adjusting part includes a holder 22 installed at the inner surface of the door glass 20 and configured to accommodate the slider 23 in state in which the slider 23 is fixed and be brought into contact with an outer surface of the slider 23, and an adjusting bolt 24 passing through the holder 22 and configured to screw-coupled to a rear end of the slider 23. The position adjusting part adjusts a relative position between the door glass 20 and the slider 23 such that the gap between the door glass 20 and the garnish 30 is adjusted.

The holder 22 is attached to the inner surface of the door glass 20. The holder 22 is attached to an inner surface of a portion adjacent to the circumference of the door glass 20 with an adhesive.

The slider 23 is accommodated inside the holder 22 such that the holder 22 supports a side surface of the slider 23. Teeth are formed at a portion at which the holder 22 and the slider 23 are in contact with each other. The teeth are formed at a portion of the holder 22 supporting the slider 23 and at an outer surface of the slider 23 and the teeth of the holder 22 and the slider 23 are engaged with each other. The teeth, which are formed at each of the holder 22 and the slider 23, prevent movement of the holder 22 and the slider 23 in an axial direction of the slider 23 such that after the relative position between the holder 22 and the slider 23 is adjusted, the holder 22 is prevented from moving in the axial direction of the slider 23, thereby allowing the door glass 20 to be maintained in a state in which the gap between the door glass 20 and the garnish 30 is adjusted.

The adjusting bolt 24 may be rotatably installed at the holder 22 and may be screw-coupled to the slider 23. Since the adjusting bolt 24 is screw-coupled to the slider 23, when the adjusting bolt 24 is rotated, the adjusting bolt 24 and the slider 23 perform relatively a rectilinear movement. Since a contactor 23a is installed at a front end of the slider 23 and the slider 23 is accommodated in a guide recess 11a of the door frame 11, the slider 23 cannot be moved in the axial direction thereof, and when the adjusting bolt 24 is rotated, the adjusting bolt 24 is moved in a longitudinal direction of the slider 23. In this case, since the adjusting bolt 24 is fixed to the holder 22, the gap between the door glass 20 and the garnish 30 is adjusted while the holder 22 is moved in the longitudinal direction of the slider 23 together with the adjusting bolt 24.

At this point, when a force for moving the adjusting bolt 24 in the axial direction of the slider 23 while the adjusting bolt 24 is rotated is greater than an engagement force between the holder 22 and the slider 23, the holder 22 and the slider 23 may perform a relative motion, i.e., a position at which the holder 22 is engaged with the slider 23 is variable. The engagement between the holder 22 and the slider 23 is maintained to prevent the relative motion of the holder 22 and the slider 23 (i.e, a movement of the holder 22 in the longitudinal direction of the slider 23) until an external force (i.e., a force for moving the adjusting bolt 24 in the axial direction of the slider 23) such that when the adjusting bolt 24 is manipulated, the holder 22 and the slider 23 may be relatively moved to easily adjust the gap between the door glass 20 and the garnish 30.

Figure 5:
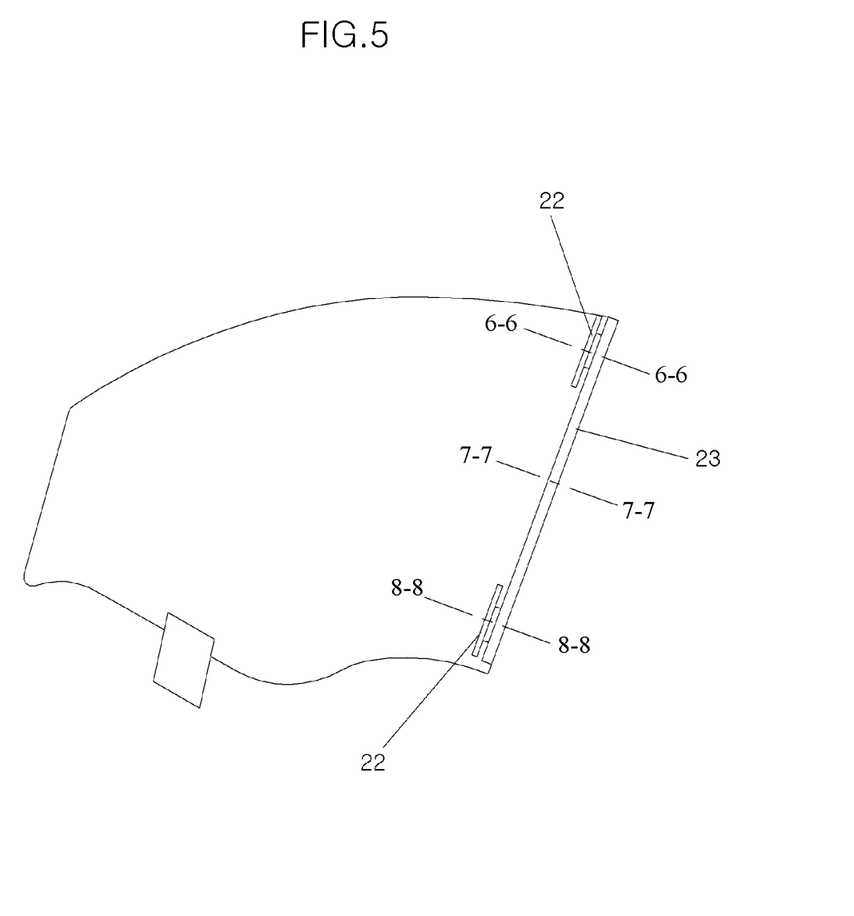
FIG. 5 is a side view for describing a position at which a position adjusting part is installed in the door glass assembly capable of adjusting position according to the present disclosure.

The position adjusting part is installed along the circumference of the door glass 20 at a regular interval. The position adjusting part may be installed in a direction perpendicular to a direction in which the door glass 20 is ascended and descended, i.e., in a vertical direction of the door glass 20 at a regular interval. Specifically, the position adjusting part may be provided at each of positions adjacent to upper and lower ends of the door glass 20, i.e., at the upper portion and the lower portion of the door glass 20.

Figure 6:
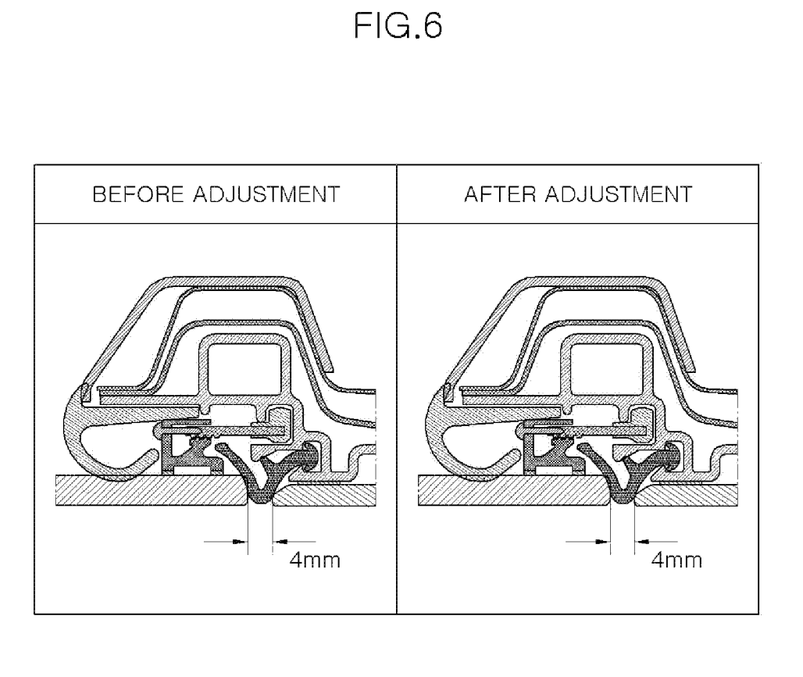
FIGS. 6-8 are side views illustrating states before and after adjusting a gap between the door glass and a garnish using the door glass assembly capable of adjusting position according to the present disclosure.
Figure 7:
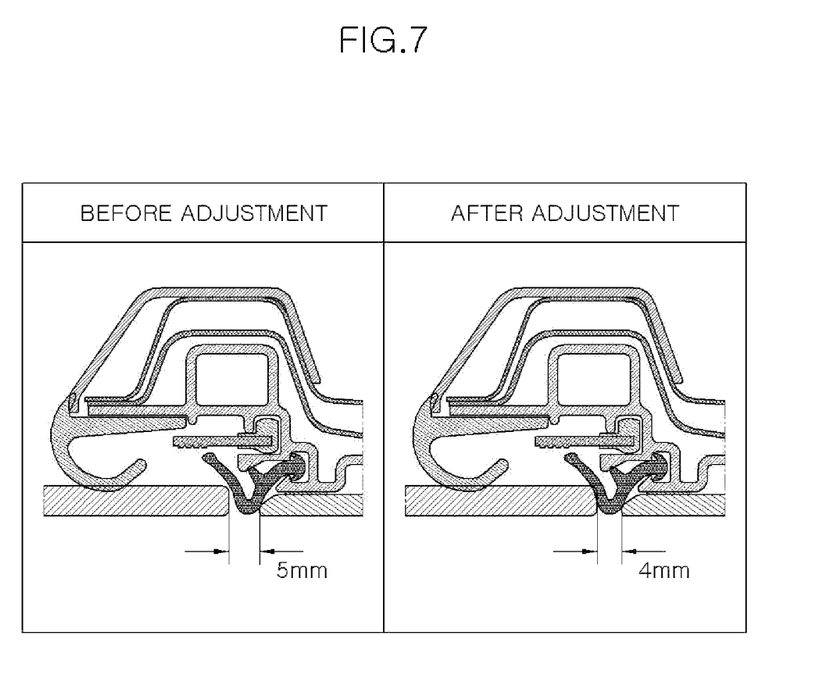
Figure 8:
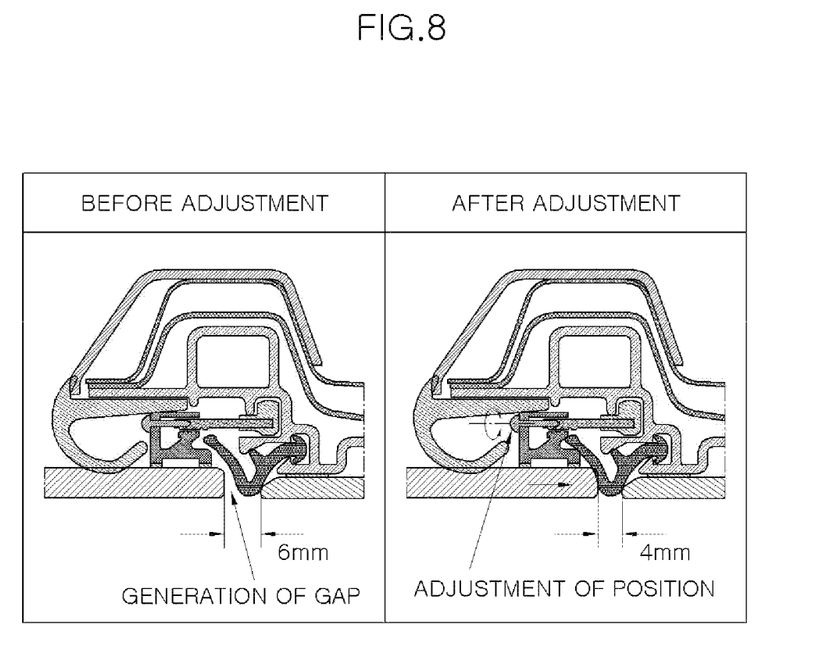

Referring to FIGS. 6-8, it is illustrated such that the position adjusting part is provided at the upper portion of the door glass 20 (i.e., a portion taken along the line I-I in FIG. 5) and the lower portion thereof (i.e., a portion taken along the line in FIG. 5), but the position adjusting part is not provided at an intermediate portion (i.e., a portion taken along the line II-II in FIG. 5). That is, the position adjusting part is installed at each of the positions adjacent to the upper and lower ends of the door glass 20. This is because the upper end or the lower end of the door glass 20 such that the gap between the door glass 20 and the garnish 30 may be adjusted.

An operation of the door glass capable of adjusting position, which has the above-described configuration, according to the present disclosure will be described below.

As shown in FIG. 1, when gaps at the upper and lower portions of the door glass 20 are different, a gap between the circumference of the door glass 20 and the garnish 30 is adjusted using the position adjusting part.

For example, when the gap at the lower portion of the door glass 20 is greater than the gap at the upper portion of the door glass 20, a position of the door glass 20 is adjusted using a position adjusting part located below the door glass 20 such that a gap between the door glass 20 and the garnish 30 is made constant.

Before the position of the door glass 20 is adjusted, a space between the door glass 20 and the garnish 30 becomes wider from the upper portion of the door glass 20 toward the lower portion thereof such that the space between the circumference of the door glass 20 and the garnish 30 is wide at the lower portion of the door glass 20 to form a gap. The glass runs 21a and 21b may be exposed through the gap, and external noise and dust may be introduced into the interior of the vehicle.

During manufacture or maintenance of the vehicle, when the gap between the circumference of the door glass 20 and the garnish 30 is not constant, the position adjusting part is operated to adjust the gap between the circumference of the door glass 20 and the garnish 30.

As shown in FIGS. 6-8, when gaps between the circumference of the door glass 20 and the garnish 30 are 4 mm, 5 mm, and 6 mm at an upper position, an intermediate position, and a lower position of the door glass 20, respectively, a position of the lower portion of the door glass 20 is adjusted such that the gap between the circumference of the door glass 20 and the garnish 30 is made constant. Since the gap at the lower position is wide, the adjusting bolt 24 is rotated using a tool. When the adjusting bolt 24 is rotated, the slider 23 is not moved in the axial direction thereof because the contactor 23a is in a state of being accommodated in the guide recess 11a. However, the holder 22 is moved in the axial direction of the slider 23 according to the rotation of the adjusting bolt 24 such that the gap between the garnish 30 and the door glass 20 to which the holder 22 is attached may be adjusted.

Meanwhile, when the manipulation of the adjusting bolt 24 is completed, the slider 23 and the holder 22 are engaged with each other by the teeth formed at circumferences of the slider 23 and the holder 22 such that the adjusted gap is maintained.

As described above, the gap between the door glass 20 and the garnish 30 is adjusted to maintain the same appropriate gap (e.g., 4 mm) in the upper position, the intermediate position, and the lower position of the door glass 20.

When the gap at upper position of the door glass 20 should be adjusted, the adjusting bolt 24 of the position adjusting part provided at the upper portion of the door glass 20 is manipulated to adjust the gap. Further, when all the gaps at the upper position and the lower position of the door glass 20 are out of a predetermined gap, the adjusting bolts 24 of the position adjusting part installed at the upper and lower portions of the door glass 20 are manipulated to the gaps.

As described above, the gap between the door glass 20 and the garnish 30 can be adjusted as desired using the position adjusting part.

In accordance with the door glass assembly capable of adjusting position according to the present disclosure, which has the above-described configuration, a position of the door glass can be adjusted by manipulating an adjusting bolt with a tool in an interior of a vehicle to push or pull an end portion of the door glass.

Even after the assembling process of the door glass or the assembling of the door glass is completed, the position of the door glass can be easily assembled by inserting the tool in a glass run made of a soft material such that an appearance of the vehicle can be improved.

Further, since the position adjusting part for adjusting the position of the door glass is not exposed even in the interior of the vehicle, an aesthetic appearance inside the vehicle cannot be degraded.

What is claimed is:

1. A door glass assembly, comprising:
    a door frame configured to form a portion of a door of a vehicle;
    a door glass installed in the door frame to be ascended and descended relative to the door frame;
    a garnish engaged with an outer surface of the door frame so that the outer surface of the door frame is finished with the garnish;
    a slider installed on an inner surface of the door glass and having a first end received in the door frame to guide as the door glass is ascended and descended relative to the door frame; and
    a position adjusting part provided on the inner surface of the door glass and configured to adjust a gap between an end portion of the door glass and the garnish by varying a position of the slider relative to the door glass,
    wherein the position adjusting part includes:
    a holder installed on the inner surface of the door glass and accomidating the slider, wherein
    the holder contacts an outer surface of the slider; and
    an adjusting bolt rotatably installed in the holder and threadedly engaging with a second end of the slider.

2. The door glass assembly of claim 1, wherein:
    the holder and the slider are engaged with each other; and
    the gap between the end portion of the door glass and the garnish is adjusted by rotating the adjusting bolt and adjusting a position of the slider relative to the holder.

3. The door glass assembly of claim 1, wherein:
    the holder includes teeth which engage with teeth on the outer surface of the slider.

4. The door glass assembly of claim 1, wherein the holder is attached to the inner surface of the door glass with an adhesive.

5. The door glass assembly of claim 1, wherein the slider extends in a direction perpendicular to a direction in which the door glass is ascended and descended.

6. The door glass assembly of claim 5, wherein:
    a guide recess is formed in the door frame and is configured to guide movement; of the slider relative to the door frame and
    a contactor is provided on the first end of the slider and is disposed in the guide recess.

7. The door glass assembly of claim 1, wherein the position adjusting part comprises a plurality of said position adjusting parts spaced apart from one another.

8. The door glass assembly of claim 1, wherein a glass run made of synthetic rubber is installed between the door frame and the door glass to seal between the the door frame and the door glass.

9. The door glass assembly of claim 1, wherein the door glass and the garnish are generally co-planar.

* * * * *